United States Patent [19]

Solomon et al.

[11] Patent Number: 4,927,514

[45] Date of Patent: May 22, 1990

[54] PLATINUM BLACK AIR CATHODE, METHOD OF OPERATING SAME, AND LAYERED GAS DIFFUSION ELECTRODE OF IMPROVED INTER-LAYER BONDING

[75] Inventors: Frank Solomon, Great Neck; Yury Genodman, Brooklyn, both of N.Y.

[73] Assignee: Eltech Systems Corporation, Boca Raton, Fla.

[21] Appl. No.: 239,582

[22] Filed: Sep. 1, 1988

[51] Int. Cl.$^5$ .............................................. C25B 11/00
[52] U.S. Cl. .............................. 204/290 R; 204/291; 204/294; 204/292; 429/42
[58] Field of Search ........ 204/284, 286, 242, 291–292, 204/129, 294, 290 R; 429/42, 44, 45, 13; 427/58, 115, 113, 122, 376.6; 502/159, 174, 326, 587

[56] References Cited

U.S. PATENT DOCUMENTS

| | | | |
|---|---|---|---|
| 3,457,113 | 7/1969 | Diebert | 136/86 |
| 4,219,443 | 8/1980 | Klinedinst et al. | 429/196 |
| 4,362,790 | 12/1982 | Blanchart et al. | 429/42 |
| 4,500,647 | 2/1985 | Solomon | 204/290 R |
| 4,541,989 | 9/1985 | Foller | 204/176 |
| 4,615,954 | 10/1986 | Solomon et al. | 429/27 |
| 4,675,094 | 6/1987 | Kaminaga et al. | 204/294 |

OTHER PUBLICATIONS

"A New High-Performance Fuel Cell Employing Conducting-Porous-Teflon Electrodes and Liquid Electrolytes", L. W. Niedrach and H. R. Alford, Research Laboratory, General Electric Company, Schenectady, N.Y., pp. 117–124.

*Primary Examiner*—John F. Niebling
*Assistant Examiner*—Kathryn Gorgos
*Attorney, Agent, or Firm*—John J. Freer

[57] ABSTRACT

A platinum black air cathode has an active layer and a support layer. The active layer comprises platinum black plus hydrophobic binder, typically a fluorinated polymer. The support layer may be made up from carbon black bound with a halopolymer binding agent. Such combination can provide for economical utilization of active ingredient without sacrifice of cathode structural integrity. To assist in this structural integrity, a thin support mesh may be used, preferably with the support layer. There can also be employed between the active layer and the support layer a porous bonding layer, which can find broader utilization with layered gas diffusion electrodes in general. For highly desirable, greatly extended operation of the platinum black air cathode, the cathode can be operated intermittently, or anodically polarized or be subjected to infrequent voltage suppression, as well as being involved with any combination of the foregoing.

19 Claims, No Drawings

PLATINUM BLACK AIR CATHODE, METHOD OF OPERATING SAME, AND LAYERED GAS DIFFUSION ELECTRODE OF IMPROVED INTER-LAYER BONDING

BACKGROUND OF THE INVENTION

There is known an electrolytic cell useful for producing ozone, which cell contains an inert anode such as an inert glassy carbon, lead dioxide or platinum anode. For the cathode, this cell employs an air cathode for reducing oxygen. The electrolyte can be strongly acidic, e.g., contain tetrafluoroborate ions typically contributed by tetrafluoroboric acid at a 48 weight percent strength or more. Such an electrochemical cell for generating ozone has been described in U.S. Pat. No. 4,541,989.

It has also been known to operate fuel cells using an aqueous electrolyte, with the cell using oxygen or air as oxidant. The cell may contain electrodes that are prepared with platinum black utilizing polytetrafluoroethylene as binding agent. Such fuel cells have been discussed for example in Journal of the Electrochemical Society, Volume 112, No. 2, pages 117-124.

There is still however, a need for electrodes serving as air cathodes for reducing oxygen, which cathodes can withstand strong electrolyte in cathode operation at high current density. For effective operation, these cathodes need to offer extended useful life. Yet, the cathodes should be economical to prepare and employ. They could, thus, not only efficiently employ costly substance such as platinum black, but also be utilized in strongly acidic environment.

SUMMARY OF THE INVENTION

An electrode has now been prepared which, especially as a platinum black air cathode, offers economical utilization of costly active ingredients. This economy is coupled with prolonged electrode life. For the platinum black air cathode, augmentation of electrode life can be obtained by periodic current interruption of short duration, coupled with anodic polarizations, in certain instances. It is also contemplated that occasional cathode polarizations to hydrogen evolution can be beneficial. Such technique has broader applications beyond platinum black air cathodes, extending to other cathodes useful in acid electrolyte. Moreover, there have now been prepared gas diffusion electrodes of broad application and having enhanced bonding of electrode layers, providing enhanced electrode dimensional stability and longer life.

Thus, one broad aspect of the invention pertains to an electrode of economical utilization of an active ingredient without sacrifice of the cathode structural integrity, such electrode comprising an electrically conductive, gas porous, gas supplying and hydrophobic support layer containing an intimate and uniform blend of particulate carbon plus hydrophobic polymer, and an electrolyte porous active layer comprising finely divided platinum catalyst particles intimately blended with, and uniformly distributed throughout, halogenated polymer binder for the platinum catalyst particles.

In another broad aspect, the invention is directed to an electrode in multi-layer form having enhanced inter-layer bonding; said electrode comprising a gas porous, polymer-containing support layer, a catalyst-containing and polymer-containing active layer and a gas porous intermediate bonding layer of thermoplastic hydrophobic polymer.

In another invention aspect pertaining to gas diffusion electrodes operating in acid electrolyte, and typically operating at high current density, the operation is interrupted by an open circuit interval, and following said interval returns to closed circuit impressed current operation. In other aspects, the invention is directed to an electrolytic cell for the production of ozone, with the cell containing at least one air cathode for reduction of oxygen, and with the air cathode being intermittently anodically polarized. In yet another inventive aspect where an electrolytic cell contains at least one air cathode for reduction of oxygen and such cathode is more particularly a platinum black air cathode, an improved method of extended life operation for the electrode can include cathode voltage suppression.

The term "gas diffusion electrode", as used herein without more, relates generally to electrodes wherein reactant gas supplied for an electrochemical reaction is applied at an electrolyte-gas interface, or zone for electrochemical reaction, in the electrode. Electrolyte is also supplied to an area, usually a face, of the electrode, which area is different from the area to which reactant gas is provided. Thus, such gas diffusion electrodes can be not only the air or oxygen cathodes as find application in metal-air batteries, including aluminum air batteries, but also can be such electrodes as may find use in applications in acid or alkaline fuel cells and ozone generators. For certain aspects of the present invention, this general expression "gas diffusion electrode" is appropriate and need not be limited to an air cathode, i.e., limited to a cathode for use only in oxygen reduction. Such broader invention aspects will be detailed as they are discussed hereinafter. In these broader invention aspects, the gas diffusion electrode may be useful in a variety of reactions including hydrogen oxidation, sulphur dioxide oxidation and organic fuel oxidation. Where a specific gas diffusion electrode is intended, e.g., a platinum black air cathode, such specific term will be used herein.

For the gas diffusion electrodes, a variety of electrolytes may come into contact with the electrode, as represented by acid electrolytes, alkaline electrolytes and saline electrolytes. The electrolytes may be non-aqueous systems, and therefore, the electrode may find use in applications such as non-aqueous electrolyte batteries. Where the electrode is either a more generic gas diffusion electrode or a more specific electrode, e.g., a platinum black air cathode, those electrodes that relate to the present invention are made up from two or more layers. There will be used terms herein to describe one layer, or a hydrophobic layer, such as the "support layer" or "backing layer" or "gas supplying layer". Then another layer, or electrolyte side layer, may often be referred to herein as the "active layer".

DESCRIPTION OF THE PREFERRED EMBODIMENTS

The support layer for the platinum black air cathode usually comprises a mixture of particulate substance, e.g., particulate carbon with hydrophobic polymer. The particulate carbons which may be employed are those which are typically poorly catalytic and usually more crystalline. Graphite or carbon black may serve as a suitable particulate carbon in the support layer. The particulate carbon used with the hydrophobic polymer will usually be very finely divided, having all particles finer than about 0.3 micron with the most useful carbons usually having particles within the range from about 5 to about 200 nanometers. In use, the particulate carbon can be expected to contain agglomerates composed of these fine particles. Advantageously, the suitable particulate carbons will include acetylene black and similar low surface carbon blacks having an average particle size of on the order of about 50 nanometers.

For the hydrophobic polymer in the platinum black air cathode support layer, there can be one or more of hydrocarbon polymers such as various vinyl resins, as well as polyethylene and polypropylene type hydrocarbon polymers of molecular weight approaching 1,000,000 or more. Usually, the most useful binder will be some to all of halocarbon polymers containing chlorine, fluorine, or both, and hence, including the fluoropolymers. Particularly useful fluoropolymers are polytetrafluoroethylene (PTFE) and fluorinated ethylenepropylene copolymer (FEP). Other useful halocarbons include polychlorofluoroethylene. Mixtures of these resins are also serviceable. For convenience, such polymers containing fluorine and other halogen, e.g., chlorine, will be referred to herein as "halocarbon" or "halogenated" polymers, while those containing just fluorine as the halogen will be termed "fluoropolymers" or "fluorinated" polymers.

Typically, the particulate carbon or the like will be blended with finely-divided dry hydrophobic polymer or with a liquid dispersion of the polymer. If a dispersion is used, subsequent heating is employed to prepare a dry blend, as well as to remove wetting agents that can be incorporated in the dispersion. Most always for such a blend the polymer will contribute from about 20 to about 60 weight percent of the blend, on a solids basis of polymer plus particulate. Less than about 20 weight percent can provide insufficient polymer for desirably binding all carbon particles, while greater than about 60 weight percent of polymer can lead to low gas porosity for the backing layer.

After mixing, the blend can then be heat treated to melt and diffuse the polymer. For example, using PTFE, heating at a temperature of about 250°–350° C. and for a time of approximately 1 to 4 hours will usually be sufficient. Upon cooling, the resulting heat treated blend can be comminuted, such as by milling, to form finely-divided particles of the particulate carbon bound with hydrophobic polymer, with all such finely-divided particles usually being within the size range of from about one micron to about 50 microns.

When the support layer is prepared from this resulting particulate blend, the blend may first be dispersed in a liquid medium. Such a medium will usually be a low boiling organic liquid medium, such as isopropyl alcohol or a blend of alcohols. The particles can be vigorously mixed into the medium by any suitable means for blending a solid particulate into a liquid to form a uniform dispersion. Where such dispersion technique is employed for forming the support layer, the dispersion medium can then be filtered onto a separable substrate, e.g., an asbestos paper or similar filter paper, and a dry layer formed, usually after incorporation therein of a suitable current distributor, for example a metal mesh. The resulting support layer will be desirably porous, for the passage of reactant gas therethrough, e.g., by having more than fifty percent of pore volume in pores of less than 0.2 micron diameter.

For the active layer, there will be used a polymeric binder which will typically be some to all of a halocarbon polymer such as a fluoropolymer. Particularly useful halocarbon polymers include fluoropolymers such as PTFE and FEP, as well as other halocarbon polymers such as polychlorofluoroethylene, with a mixture of these resins also being serviceable, but PTFE is preferred. The polymer can be utilized as a very finely divided particulate solid, e.g., of micron-sized particles. Such particles can then be dispersed in a liquid medium, e.g., an aqueous or an organic liquid medium such as an alcohol medium, or dispersed in a mixture of these liquids. Alternatively, a previously prepared polymer dispersion may be used, for example a commercially available dispersion containing sub-micron sized PTFE particles.

For preparing the active layer for a platinum black air cathode, the polymer will then be mixed with active ingredient. This ingredient is platinum black or suitable equivalents, as for example platinum on finely divided carbon. For convenience, all of such suitable materials may be referred to herein simply as "platinum black" or "platinum catalyst particles." Usually the particles of platinum black will be finely divided, e.g., micron-sized particle agglomerates, with the agglomerates having size within the range from about 0.1 micron or less to about 10 microns or more. As mentioned hereinbefore, these particles plus the polymer can then be blended together, usually in an aqueous medium by any means for intimately blending together very finely divided solids in a liquid, e.g., ultrasonic agitation or high speed stirring. It is, however, to be understood that mixing together of dry ingredients is also contemplated, and thus, dry blending would be utilized. For any such means for bringing the active ingredient and polymer together, the polymer will contribute only a minor weight amount, usually from about 0.1 to 10 weight percent of the blend, on a solids basis of polymer plus active ingredient. Less than about 0.1 weight percent can provide insufficient polymer for desirably binding all of the active ingredient particles into an adherent active layer. On the other hand, greater than about 10 weight percent of polymer can lead to an active layer of retarded activity. Preferably, for best activity plus economy, there will be present in the active layer from about 4 to 6 weight percent of polymer, basis polymer plus active ingredient.

After mixing, the active layer ingredients can then be deposited onto the support layer, or onto an intermediate bonding layer treated support layer, which treated support layer will be discussed in greater detail later on hereinbelow. For application to the support substrate, the active ingredients are advantageously in a dispersion which is filtered onto the substrate. That is, particulate ingredients may be uniformly dispersed in liquid medium, e.g., water or an organic liquid medium. The uniform dispersion of particulates in liquid medium can then be filtered to provide the initial, wet active layer. The support substrate will serve as the filter medium. By this means, the liquid of the active layer dispersion passes through the gas supplying layer leaving the active layer in intimate deposition thereon. As in the formation of the support layer, the damp, freshly deposited active layer can then be dried, e.g., at a moderate temperature usually at, or slightly above the boiling point of the dispersion liquid medium, while under a moderate, mechanical pressure.

The resulting dried layer may then be sintered, under pressure, to provide an electrode structure consisting of a support layer and an active layer. Most always there will, however, be used between the support layer and the active layer an intermediate bonding layer, as will be more particularly discussed hereinbelow. Also, there can be present, optionally, a conductive or reinforcing means, e.g., a metal mesh, that also will be more fully discussed hereinbelow. It is contemplated that both the intermediate layer and reinforcing means will be present, when used, before sintering. Sintering provides that the electrode is bonded together, i.e., sintered, by heat and pressure. Typically only a moderate pressure, of on the order of approximately 100 to 500 psi will be employed. This sintering is conducted at a temperature sufficiently low to not cause any deleterious polymer decomposition, e.g., when PTFE is present in both the support layer and the active layer, heating can be at a temperature within the range of from about 280° to 350° C. Generally, sintering temperatures will not exceed above about 350° C. Heating times of on the order of about a few minutes, e.g., 0.5 to 10 minutes, are sufficient.

The resulting electrode structure can consist of a support layer and an active layer, with optionally a porous thermoplastic polymer bonding layer, and the conductive or reinforcing means. A platinum black air cathode of this structure may advantageously be used for oxygen reduction in acid or alkaline fuel cells, metal-air batteries, or the like. In a particular application, this structure is used to effect oxygen reduction cathodically in an electrochemical ozone generator. The ozone is generated anodically, as from glassy carbon anodes which process has been more particularly described in U.S. Pat. No. 4,541,989. The electrolyte is strongly acidic, e.g., has a pH typically of about 1 to 2. Hence, these platinum black air cathodes find special utility in strongly acidic conditions. In the electrochemical ozone generator, the electrolyte can contain tetrafluoroborate anions typically contributed by tetrafluoroboric acid ($HBF_4$). This acid used at commercial strength is 48 weight percent acid although acid of higher strength may be employed in the ozone generator, and the platinum black air cathode described herein will be useful therein. As mentioned hereinabove, before the electrode structure of support layer and active layer is completed, there can be used in between, for the enhanced binding together of these layers, a thin, porous layer of thermoplastic hydrophobic polymer.

It is to be understood that although this binding layer is applicable to the above-described platinum black air cathode layers, it is also more broadly useful for gas diffusion electrodes. For this intermediate bonding layer, the polymer for most efficient bonding is advantageously one or more halogenated polymers containing chlorine atoms, fluorine atoms or mixtures thereof, and for best bonding one or more fluoropolymer, e.g., PTFE or FEP or their mixtures, with FEP being preferred for most effective use. It is necessary that this intermediate layer give incomplete coverage between the layers to be joined to preserve the porosity of one or both of the adjoining layers. Thus by use of the term "layer" for this bonding layer, it is meant that such is thin and porous and may be incomplete even to the point of being visibly discontinuous. For the representative fluorinated ethylene propylene copolymer of the bonding layer, such thin and porous layer can be provided with an amount of such copolymer of from about 0.01 milligram per square centimeter ($mg/cm^2$) up to about 0.4 milligram per square centimeter of coated substrate layer. If less than about 0.01 milligram per square centimeter of this fluoropolymer is applied to an underlying support layer, there can be insufficient bonding layer polymer for enhancing resistance to delamination of adjoining layers during electrode use. On the other hand, use of greater than about 0.4 milligram per square centimeter of this fluoropolymer may lead to a significantly gas impermeable blocking layer. Preferably for best porosity without deleterious blocking, there will be applied an intermediate bonding layer in an amount from about 0.03 to about 0.1 milligram per square centimeter.

It is advantageous that the thermoplastic hydrophobic polymer for the bonding layer be used as a very finely divided particulate and preferably for efficient use, be utilized as a colloidal dispersion of the polymer. For selecting a suitable particle size for the polymer, the pore size of one or more of the layers to be bound may be considered, so that there may be a major pore volume from pores having a diameter at least substantially the same as the average particle size of the polymer For example, where an underlying support layer has 50% or more of the pore volume in pores on the order of 0.15 micron diameter, it will be suitable to select a thermoplastic hydrophobic polymer having an average particle size diameter from about 0.1 micron to 0.2 micron diameter. When a polymer has been selected of a suitable average particle size in relation to the pore size of the substrate to which it will be applied, application can then proceed, e.g., by dry coating technique for dry particulate polymer, or preferably by liquid coating technique of a dispersion of the polymer. Taking into consideration the usual tortuosity of the underlying layer, as well as particle size considerations, commercially available aqueous colloidal dispersion may also be used. However, these are usually diluted, e.g., to cut dispersion solids down to about 0.001 to about 0.01 weight percent. The dispersion is then filtered out to form the thin, porous layer on the underlying substrate surface. After application, this intermediate bonding layer is then typically dried, e.g., ambient air dried, or forced air dried at modest temperatures, such as on the order of 100°–200° C. Drying can be followed by heat treating to heat bind or heat seal the layers together. Heat treating can be accomplished at a more elevated temperature, such as a temperature within the range from about 250°–350° C. for the preferred fluorinated ethylene propylene copolymer. Usually, the intermediate bonding layer drying and heat treating is conducted simply at atmospheric pressure for economy although differing pressure, either subatmospheric or superatmospheric may be employed.

It is to be understood as mentioned hereinbefore that although this bonding layer has been found to be especially useful for binding the above-described support and active layers, such is contemplated to have broader applications. Hence, it is contemplated to be useful in the binding of electrode layers wherein each comprise a thermoplastic polymer as a layer constituent. This can be the binding of simply a porous PTFE or the like support layer to a catalyzed carbon/PTFE active layer, or it can be the binding of a "quick-start" layer for the preparation of a gas diffusion electrode. Thus, it can be useful where active layers may include other than carbon catalyst, e.g., a metal catalyst such as platinum black or other platinum group catalyst as well as metal compound catalysts.

A mentioned hereinabove, for preparing a more rugged, self-sustaining and long-life gas diffusion electrode, there may be used on broad planar faces of the sheet electrode or on the support layer only of a platinum black air cathode, a foraminous overlay, e.g., a mesh structure. Such can be a screen of woven wire cloth or expanded metal or fiber metal having an extensive open area, although materials other than metal meshes may be used such as carbon cloth. The extensive open area permits ready access through the foraminous overlay of fluid, i.e., of liquid or gas, to the underlying sheet electrode. Regardless of specific construction, the preferred structure will usually be referred to herein as simply the "mesh." The material of the mesh may be electrically conductive, and if use is to include contact with electrolyte, care must be taken to select corrosion resistant material, i.e., resistance to corrosion by the electrolyte, including acidic battery electrolyte.

Where metal meshes are used with platinum black air cathodes, the metal of the mesh may typically be nickel, lead, tantalum, gold, silver, or silver plated nickel, or silver plated copper, possibly with a strike such as a nickel strike. Other materials that may be used for the mesh of the platinum black air cathode include corrosion resistant plastics if electrical conductivity is not needed, as well as valve metals, or painted substrate metals, e.g., silver painted with carbon or graphite containing paints having binders including halocarbon binder. Meshes can be used on each side of the air cathode. For example, an expanded valve metal mesh may be placed on the active layer side and a gold plated expanded silver metal grid then utilized on the support layer side, especially for exposure to certain acid electrolytes, such as electrolytes containing $HBF_4$. With the platinum black air cathode, because the strongly acid electrolyte is so aggressive, only a gold plated silver expanded mesh located on the air side of the support layer is preferred. For the woven wire meshes, these will typically be comprised of wires that are from about 0.1 to about 0.2 millimeter in diameter.

The mesh is pressed into the face of the electrode. The mesh can be pressed into dried electrode material, which may then be sintered. Most usually, the mesh is pressed into damp, freshly deposited electrode material, e.g., support layer material, before such material is heat treated. The pressure employed can range from a moderate pressure of on the order of about 500 psi, which will be sufficient for desirably pressing the overlaid mesh into the underlying sheet electrode face, up to elevated pressures of 1000 psi or so, or ranging up to a very elevated pressure of about 3000–4000 psi or more.

The resulting electrode structure taking into consideration all of the foregoing, can then consist of a support layer and an active layer, the optional porous thermoplastic polymer bonding layer, and the conductive or reinforcing means, e.g., metal mesh, carbon cloth, carbon fibers, or the like, with the reinforcing means being in at least one of either the support or active layers. The whole structure is bonded together by the simultaneous application of heat and pressure as has been discussed more fully hereinabove. This structure when prepared in this manner is especially useful as a platinum black air cathode for effecting oxygen reduction cathodically in an electrochemical ozone generator as has been described more fully hereinbefore.

In broader application, for operation in acid electrolyte at elevated current density, periodic current interruptions have been found to have a profoundly beneficial effect on operating voltage and electrode useful life. Such interrupted current operation may be randomly intermittent or, preferably for best extended operation, be at periodically regular intervals on a lapsed time basis. On such basis, extended serviceable life operation has been accomplished, on a cycle where there is first normal cathode operation for about 30 minutes to about several hours, e.g., 1 to 3 hours or more, followed by open circuit of short duration. Usually such short duration open circuit mode will continue for only a few minutes, e.g., one minute to about 15 minutes. Preferably for economy of operation, coupled with extended cathode operation, such rest period will be for a time of from about 3 to about 8 minutes. In the exemplary circumstance of a platinum black air cathode operating at an elevated current density typically up to 200 milliamps per square centimeter in an electrochemical cell for ozone generation, such will then be reduced to zero during such rest period. Following such rest period, it has been found that the cathode will recover to approximately its prerest voltage potential. Such recovery can be very consistent and the cathode operation very steady over an extended period of time, e.g., a time as measured in months of operation. It is to be understood that although this interrupted mode of operation has been found useful for ozone generation in an acidic fluoride environment, it is contemplated that such mode may be utilized in other acid systems typically operating at elevated current density and which systems might experience concentration polarization.

Where the electrode is a platinum black air cathode that will be employed in an electrochemical ozone generator, there can be applied to the electrode a short low current anodic treatment, which may be useful in overcoming hydrophobicity of the active layer. Typically, a cathode current density of 1 milliamp per square centimeter (1 $ma/cm^2$) for 1 minute is sufficient to accomplish this purpose. Following this, subsequent operation as an air cathode at 200 $ma/cm^2$ has proven feasible. It has also now been found beneficial to occasionally anodically polarize the electrode at either random or regular intervals. These anodic treatments may be performed at more widely spaced intervals than for the above described current interruptions. Anodic treatments (by cell current reversal) within the range of from about 1 to about 5 $ma/cm^2$ will be serviceable, with treatments within the range from about 2–4 $ma/cm^2$ being most advantageous for efficient treatment. Usually, treatment times will be from about 5 to about 20 minutes, with 12–18 minute times being more typical. Such treatments, approximately once a day to once a week are desirable for extended cathode life. Generally, the electrode voltage can be limited to about 1.25 to 1.5 volts as measured against a normal hydrogen on platinum reference electrode during the anodic treatment. The anodic polarization can be undertaken by any elements typically useful for such operation, e.g., switching means interposed between a power source and the cathode.

Also advantageous in operation of the platinum black air cathode is the occasional suppression of the air cathode voltage from its normal operating level. Typically, with an operating voltage of about 0.5 volt positive, as measured against a normal hydrogen on platinum reference electrode, in the same electrolyte, such suppression can lead to a voltage decrease of as much as the 0.5 volt or more, e.g., to about −0.1 volt at a current density within the range from about 40 to about 200 $ma/cm^2$. Generally, voltage suppression times of about 2–10 minutes will be serviceable, with a time of about 3-7 minutes being preferred for efficient air cathode operation. Suppression of the cathode voltage can be accomplished by interrupting the reactant gas, e.g., air or oxygen supply, while operating the cell, thereby polarizing the cathode to a more negative potential. Such treatment need only be carried out infrequently, e.g., once every 2-8 weeks, with a treatment of once-a-month being more usual. If the cell under treatment is contained in a cell stack, for efficient, continued output from the cell stack, advantageously only one cell at a time will be undergoing cell voltage suppression treatment.

The following examples show ways in which the invention has been practiced, but should not be construed as limiting the invention.

EXAMPLE 1

A particulate material for use in preparing a support layer was provided by dispersing 50 weight parts of acetylene black (Shawinigan Black) in water. To this there were added dispersions of particulate polytetrafluoroethylene (PTFE) and of particulate ethylene-propylene copolymer (FEP) sufficient to provide a weight ratio of PTFE to FEP of 3:2. The resulting dispersion was dried and milled to a particulate product.

A hydrophobic support layer was then prepared by first dispersing the resulting carbon black/PTFE/FEP fine powder in isopropyl alcohol, and then depositing the resulting dispersion onto a separable filter paper. The deposition was in sufficient amount to provide 10 milligrams (mg.) (dry basis) of fine powder solids per sq. cm. ($cm^2$) of filter substrate. A foraminous expanded metal mesh current collector was pressed in the resulting damp layer of solids, and the solids dried. The mesh current collector was gold plated, silver wire of about $0.13 \times 0.13$ mm cross-section with about 625 openings per square inch. The filter paper was removed and the dried layer was then pressed flat at 1000 psi while at a temperature of 110° C., thereby forming an air cathode support layer. Finally, the hydrophobic support layer was sintered at 285° C. under an applied pressure of 200 psi, for about 5 minutes, to increase the strength of the layer.

A mixture of platinum black and PTFE dispersion containing 5% PTFE (TEFLON ™ 30 dispersion from duPont) was highly dispersed in water for 3 minutes using ultrasonic agitation. The dispersion was suction filtered on the above-prepared carbon-fluoropolymer support layer which provided a fresh deposit of 15 mg/$cm^2$ of active layer containing about 95 percent platinum black. The electrode, with its deposited active layer was dried and sintered at 335° C. while pressed at 300 psi, all for 4 minutes.

EXAMPLE 2

One square inch of a three square inch electrode prepared in Example 1, was tested as an air cathode in a cell having a chemically inert glassy carbon counterelectrode, as has been described in U.S. Pat. No. 4,541,989, and a D.C. power source. The anode evolved oxygen at the same rate at which the air cathode consumed oxygen from a circulating air supply. The air supplied flowed at 4 times the theoretical requirement. The cell electrolyte was a mixture of 7N $HBF_4$ with 3% HF and ½% NaF, and was operated at 40° C. to 50° C.

Twenty minutes after wet-down, current was applied and reached 250 milliamps (ma) per $cm^2$. in one hour after starting at 1 ma/$cm^2$. At 200 ma/$cm^2$, the cathode voltage was initially 0.5 volt, measured against the reversible hydrogen electrode, and improved to 0.6 volt within 3 hours. Current was then maintained at 200 ma/$cm^2$ for the duration of the test. Voltage slowly declined to 0.2 volt over the next 5 days, at which point the test was discontinued. This cell thus attained a lifetime not previously achieved with a platinum black air cathode operating at 200 ma/$cm^2$ in this aggressive electrolyte.

EXAMPLE 3

A hydrophobic support layer was prepared in the manner described in Example 1. Onto this there was then deposited a thin film of colloidal FEP copolymer having FEP copolymer particles of 0.15 micron diameter, average, dispersed in water. The colloidal dispersion was suction filtered onto the support layer in an amount providing a copolymer loading of 0.033 mg/$cm^2$ (dry basis). The resulting deposit was then dried and heat treated at 300° C. for one hour without applied pressure.

An active layer, prepared in the manner of Example 1, was deposited on, and sintered on, the resulting FEP-coated support layer, all in the manner of Example 1. When the resulting product was utilized as an electrode and tested under the conditions of Example 2, the electrode functioned with comparable performance to the electrode of Example 2, except for a highly desirable 1000% extended life without support-layer-to-active-layer delamination, which was the cause of failure of the electrode of Example 2.

EXAMPLE 4

An electrode was prepared as described in Example 3 including hydrophobic support layer, FEP copolymer bonding layer, and platinum-black-containing active layer. The resulting electrode was used as an air cathode and tested in a cell as described in Example 2 under the conditions of Example 2. In utilization, the electrode was placed on a regime where current was periodically interrupted on an elapsed time basis, the repeating 70 minute cycle of the regime being 65 minutes of operation, followed by 5 minutes off. In the initial 65 minutes of operation, the electrode at 200 ma/$cm^2$ reached a voltage of $+0.5$ volt as measured against a hydrogen on platinum electrode in the same electrolyte.

Following the initial 5 minutes off, the electrode potential recovered to approximately $+1.015$ volts. A very steady and highly desirable closed circuit operation, following the above noted regime was achieved for 149 days.

EXAMPLE 5

An electrode was prepared as described in Example 3 including hydrophobic support layer, FEP copolymer bonding layer, and platinum-black-containing active layer. The resulting electrode was used as an air cathode and tested in a cell as described in Example 2 under the conditions of Example 2. In utilization, the electrode was on a regime of occasional anodic treatment. Normal operating voltage of $+0.55$ volt at 200 ma/$cm^2$ had drifted down to 0.24 volt on day 123, i.e., in 123 consecutive days of operation. After anodizing at 3 ma/$cm^2$ to $+1.35$ volts in 14 minutes, voltage improved to $+0.75$ volt. This fell to $+0.55$ volt by day 124.

On the next three successive days, this treatment was continued at 3 ma/$cm^2$ to $+1.35$ volts for 11.5, 12 and 11.83 minutes, respectively. Results were identical, showing reproducibility. Voltage drived down from +0.55 volt to +0.35 volt on day 142. Anodic treatment for 13.33 minutes at 3 ma/cm² to +1.35 volts reestablished a voltage to +0.55 which, without further anodic treatment was still +0.35 volt on day 188.

In a second electrode operating at 200 ma/cm² voltage was +0.2 volt at day 151. After anodizing at 3 ma/cm² to +1.35 volts, voltage improved to +0.55 volt and was operating at +0.35 volt on day 217.

We claim:

1. An electrode in multi-layer form and having enhanced inter-layer bonding, said electrode comprising a gas porous, polymer-containing support layer, a catalyst-containing and polymer-containing active layer and a gas porous intermediate bonding layer consisting of thermoplastic hydrophobic polymer.

2. The electrode of claim 1, wherein said support layer is an electrically conductive, gas supplying and hydrophobic support layer.

3. The electrode of claim 2, wherein said support layer contains particulate carbon.

4. The electrode of claim 1, wherein said support layer contains from about 20 to about 60 weight percent of hydrophobic polymer.

5. The electrode of claim 1, wherein said support layer comprises hydrophobic polymer of one or more of hydrocarbon or halogenated hydrocarbon polymer.

6. The electrode of claim 5, wherein said hydrophobic halogenated polymer is one or more of polytetrafluoroethylene, fluorinated ethylene-propylene copolymer or polychlorofluoroethylene.

7. The electrode of claim 1, wherein said polymer-containing active layer is an intimate blend of halogenated polymer plus particulate catalyst.

8. The electrode of claim 1, wherein said active layer polymer is fluoropolymer.

9. The electrode of claim 8, wherein said active layer fluoropolymer is supplied at least in part by one or more of polytetrafluoroethylene and fluorinated ethylene-propylene copolymer.

10. The electrode of claim 1, wherein said active layer contains a minor weight amount of said polymer and a major weight amount of said catalyst.

11. The electrode of claim 1, wherein said catalyst-containing active layer contains catalyst comprising metal catalyst, metal compound catalyst, carbon catalyst and their mixtures.

12. The electrode of claim 1, wherein said intermediate bonding layer consists essentially of a gas porous discontinuous layer of fluorinated polymer.

13. The electrode of claim 1, wherein said intermediate bonding layer is present in an amount within the range of from about 0.01 to about 0.4 milligram per square centimeter.

14. The electrode of claim 1, wherein a foraminous overlay contacts at least one of said support layer or said active layer.

15. A cell containing a gas diffusion electrode as defined in claim 1.

16. An electrode comprising:
    (a) an electrically conductive, gas porous and hydrophobic support layer comprising an intimate and uniform blend of hydrophobic polymer plus particulate carbon;
    (b) an electrolyte porous active layer comprising an intimate and uniform blend of finely divided platinum catalyst particles bound with halogenated polymer binder;
    (c) a gas porous intermediate bonding layer, consisting of hydrophobic thermoplastic halogenated polymer, situated between said support layer and said active layer; and
    (d) a foraminous overlay compressed against a broad face of one or more of said support layer and said active layer of said electrode.

17. The electrode of claim 16, wherein said foraminous overlay is a metal mesh.

18. The electrode of claim 16, wherein said foraminous overlay is compressed against a broad face of said support layer.

19. A battery containing an electrode as defined in claim 16.

* * * * *